(12) United States Patent
Vaarno et al.

(10) Patent No.: US 10,220,331 B2
(45) Date of Patent: Mar. 5, 2019

(54) METHOD OF MANUFACTURING A SOLVENT EXTRACTION SETTLER AND SOLVENT EXTRACTION SETTLER

(71) Applicant: OUTOTEC (FINLAND) OY, Espoo (FI)

(72) Inventors: Jussi Vaarno, Sundsberg (FI); Rami Saario, Espoo (FI); Henri Fredriksson, Helsinki (FI); Jussi Pajala, Vantaa (FI)

(73) Assignee: Outotec (Finland) Oy, Espoo (FI)

( * ) Notice: Subject to any disclaimer, the term of this patent is extended or adjusted under 35 U.S.C. 154(b) by 461 days.

(21) Appl. No.: 14/408,417

(22) PCT Filed: Jun. 12, 2013

(86) PCT No.: PCT/FI2013/050645
§ 371 (c)(1),
(2) Date: Dec. 16, 2014

(87) PCT Pub. No.: WO2014/001625
PCT Pub. Date: Jan. 3, 2014

(65) Prior Publication Data
US 2015/0151218 A1    Jun. 4, 2015

(30) Foreign Application Priority Data

Jun. 26, 2012   (FI) ..................................... 20125713

(51) Int. Cl.
*B01D 11/04* (2006.01)
*B01D 21/00* (2006.01)
(Continued)

(52) U.S. Cl.
CPC .......... *B01D 11/04* (2013.01); *B01D 11/0446* (2013.01); *B01D 21/0003* (2013.01);
(Continued)

(58) Field of Classification Search
CPC . B01D 11/04; B01D 11/0446; B01D 11/0449; B01D 11/0453; B01D 11/0457;
(Continued)

(56) References Cited

U.S. PATENT DOCUMENTS

| 2,258,982 A | 12/1938 | Gordon et al. |
| 2,728,457 A | 12/1955 | Clarke |

(Continued)

FOREIGN PATENT DOCUMENTS

| CL | 201101901 | 8/2008 |
| CN | 1216932 A | 5/1999 |

(Continued)

OTHER PUBLICATIONS

Derwent Abstract of GB 1,494,579 published Dec. 1977.*

(Continued)

*Primary Examiner* — Joseph W Drodge
(74) *Attorney, Agent, or Firm* — Chernoff, Vilhauer LLP

(57) ABSTRACT

A method of manufacturing a solvent extraction settler comprises manufacturing at the site of manufacture, such as in an engineering workshop, a plurality of self-supporting settler element modules (2, 3, 4, 5) each having exterior dimensions, strength and handling and securing means (6) conforming to shipping container standards, transporting the modules (2, 3, 4, 5) to the site of installation as normal freight by transport equipment, such as trucks, trailers and container ships, capable of handling and transporting shipping container standard compatible units, and assembling the modules (2, 3, 4, 5) into a complete settler at the site of installation. The settler comprises a module group (1) consisting of a plurality of self-supporting settler element modules (2, 3, 4, 5) each having exterior dimensions, strength and handling and securing means (6) conforming to ISO shipping container standards to enable ISO compatible transportability.

25 Claims, 11 Drawing Sheets

(51) Int. Cl.
*B01D 21/24* (2006.01)
*B65D 90/14* (2006.01)

(52) U.S. Cl.
CPC ..... *B01D 21/0033* (2013.01); *B01D 21/2444* (2013.01); *B65D 90/143* (2013.01); *Y10T 29/49826* (2015.01)

(58) Field of Classification Search
CPC .. B01D 21/00; B01D 21/0003; B01D 21/003; B01D 21/0033; B01D 21/0036; B01D 21/0039; B01D 21/0042; B01D 21/0045; B01D 21/01; B01D 21/02; B01D 21/08; B01D 21/24; B01D 21/2427; B01D 21/244428; B01D 17/0211; B01D 17/0214; B01D 21/2444; B01D 21/28; B65D 88/022; B65D 88/027; B65D 88/12; B65D 88/121; B65D 88/128; B65D 90/143; B65D 7/00; B65D 11/00; Y10T 29/49826; B29C 39/04; B29C 39/08; B29C 39/38; B29C 39/44; B29C 33/00; B29C 33/38; B29C 41/04; B29C 41/06; B29C 43/04; B29C 43/06; B29C 2043/043; B29C 65/00; B29C 65/002; B29C 65/02; B29C 65/022
USPC .... 210/511, 513, 521, 522, 532.1, 534, 538, 210/540, 634, 519, DIG. 5; 220/4.01, 220/4.12, 4.21, 4.24, 4.26, 4.27, 565; 264/239, 241, 250, 310–312; 366/131, 366/136, 184, 189, 192, 336, 341, 348, 366/349; 414/800, 801, 802, 809, 787; 425/425, 429, 434, 435
See application file for complete search history.

(56) References Cited

U.S. PATENT DOCUMENTS

| | | | |
|---|---|---|---|
| 2,728,708 A * | 12/1955 | Fenske | C10G 21/28 196/14.52 |
| 2,868,384 A | 1/1959 | Puddington | |
| 3,419,145 A | 12/1968 | De Celis | |
| 3,544,079 A | 12/1970 | Dressler | |
| 3,663,178 A * | 5/1972 | Miller | B01D 11/0457 422/159 |
| 3,828,933 A * | 8/1974 | Hampton et al. | B01D 21/00 210/195.3 |
| 3,951,817 A | 4/1976 | Snyder | |
| 4,218,311 A | 8/1980 | Newrick | |
| 4,268,484 A * | 5/1981 | Gavin | B01D 11/04 422/259 |
| 4,294,702 A | 10/1981 | Finsterwalder | |
| 4,476,018 A | 10/1984 | White et al. | |
| 4,656,067 A | 4/1987 | Yetter | |
| 4,747,978 A | 5/1988 | North | |
| 5,028,333 A * | 7/1991 | Wright | B01D 17/0211 210/237 |
| 5,049,278 A * | 9/1991 | Galper | B01D 21/0003 210/521 |
| 5,103,641 A | 4/1992 | Maus et al. | |
| 5,185,081 A | 2/1993 | Nyman et al. | |
| 5,254,244 A * | 10/1993 | Chomel | B01D 11/0457 210/232 |
| 5,266,191 A | 11/1993 | Greene et al. | |
| 5,435,924 A | 7/1995 | Albertson | |
| 5,552,050 A | 9/1996 | Valentin | |
| 5,558,780 A | 9/1996 | Vancas | |
| 5,585,008 A | 12/1996 | Ilg et al. | |
| 5,611,453 A * | 3/1997 | Schwartz | B65D 90/022 220/62.19 |
| 5,632,925 A * | 5/1997 | Moulton | B29C 33/02 249/115 |
| 5,662,861 A | 9/1997 | Taylor | |
| 5,662,871 A | 9/1997 | Nyman et al. | |
| 6,083,400 A | 7/2000 | Nyman et al. | |
| 6,132,615 A | 10/2000 | Nyman et al. | |
| 6,176,608 B1 | 1/2001 | Nyman et al. | |
| 6,245,243 B1 | 2/2001 | Meurer | |
| 6,267,900 B1 | 7/2001 | Nyman et al. | |
| 6,350,354 B1 * | 2/2002 | Neuman | C22B 3/0005 204/233 |
| 6,432,370 B1 | 8/2002 | Nyman et al. | |
| 6,558,558 B1 | 5/2003 | Hall | |
| 6,977,038 B2 * | 12/2005 | Jowett | C02F 3/04 210/151 |
| 7,390,420 B2 | 6/2008 | Nyman et al. | |
| 7,507,343 B2 * | 3/2009 | San Lorenzo | B01D 11/0449 210/511 |
| 7,517,461 B2 | 4/2009 | Nyman et al. | |
| 7,611,635 B2 | 11/2009 | Chieng et al. | |
| 7,731,853 B2 | 6/2010 | Ekman et al. | |
| 7,736,584 B2 * | 6/2010 | Kahikko | B01D 11/0446 156/60 |
| 7,984,819 B1 * | 7/2011 | Davis | B65D 88/524 220/1.5 |
| 8,858,799 B2 | 10/2014 | Outotec | |
| 9,631,254 B2 * | 4/2017 | Vaarno | C22B 3/02 |
| 2004/0096608 A1 | 5/2004 | King et al. | |
| 2005/0040106 A1 | 2/2005 | Gigas et al. | |
| 2005/0218072 A1 * | 10/2005 | San Lorenzo | B01D 11/0449 210/634 |
| 2006/0113246 A1 * | 6/2006 | Ekman | B01D 11/0446 210/634 |
| 2007/0263486 A1 | 11/2007 | Suhner | |
| 2009/0039092 A1 * | 2/2009 | Huang | B63B 25/004 220/694 |
| 2009/0104504 A1 | 4/2009 | Roussin-Bouchard et al. | |
| 2009/0152777 A1 | 6/2009 | Kahikko et al. | |
| 2010/0025407 A1 * | 2/2010 | Benson | B65D 88/022 220/564 |
| 2010/0051548 A1 | 3/2010 | Dorlac et al. | |
| 2010/0288702 A1 * | 11/2010 | Lavie | B01D 11/04 210/644 |
| 2010/0294715 A1 | 11/2010 | Saario et al. | |
| 2011/0109073 A1 * | 5/2011 | Williams | B60P 3/2215 280/836 |
| 2011/0236152 A1 | 9/2011 | Lu et al. | |
| 2011/0297606 A1 | 12/2011 | Vaarno | |
| 2011/0297675 A1 * | 12/2011 | Johnson | B60P 3/14 220/8 |
| 2011/0303619 A1 | 12/2011 | Nyman et al. | |
| 2012/0085756 A1 * | 4/2012 | Beitler | B65D 88/128 220/1.5 |
| 2012/0171006 A1 * | 7/2012 | Berry | G06Q 10/06 414/800 |
| 2014/0110359 A1 | 4/2014 | Haywood et al. | |
| 2015/0151218 A1 | 6/2015 | Vaarno et al. | |
| 2015/0151460 A1 | 6/2015 | Saario et al. | |
| 2015/0159236 A1 | 6/2015 | Vaarno et al. | |
| 2015/0182874 A1 | 7/2015 | Vaarno et al. | |
| 2015/0190732 A1 | 7/2015 | Vaarno et al. | |
| 2015/0190734 A1 | 7/2015 | Vaarno et al. | |
| 2015/0232960 A1 | 8/2015 | Vaarno et al. | |
| 2016/0130681 A1 | 5/2016 | Vaarno et al. | |

FOREIGN PATENT DOCUMENTS

| | | |
|---|---|---|
| CN | 1216933 A | 5/1999 |
| CN | 2480439 | 3/2002 |
| CN | 1652853 A | 8/2005 |
| CN | 1652855 A | 8/2005 |
| CN | 2748146 Y | 12/2005 |
| CN | 1805773 A | 7/2006 |
| CN | 201071566 Y | 6/2008 |
| CN | 101449012 B | 6/2009 |
| CN | 201366254 Y | 12/2009 |
| CN | 102292133 A | 12/2011 |
| CN | 202128943 Y | 2/2012 |
| DE | 3704326 A1 | 8/1988 |
| EP | 0156699 A1 | 10/1985 |

(56) References Cited

FOREIGN PATENT DOCUMENTS

| | | |
|---|---|---|
| EP | 0430248 A2 | 6/1991 |
| EP | 0973595 B1 | 9/2001 |
| EP | 2019890 A1 | 2/2009 |
| EP | 20190890 A1 | 2/2009 |
| EP | 2114548 A2 | 11/2009 |
| GB | 835912 | 5/1960 |
| GB | 1494579 * | 12/1977 |
| GB | 2341340 A | 3/2000 |
| GB | 2476102 A | 6/2011 |
| JP | 2001-29703 A | 2/2001 |
| JP | 2001029703 | 2/2001 |
| NO | 20015454 A | 11/2006 |
| WO | 9740899 | 11/1997 |
| WO | 9740900 | 11/1997 |
| WO | 9740901 | 11/1997 |
| WO | 9740901 A1 | 11/1997 |
| WO | 9741938 | 11/1997 |
| WO | 0074895 A1 | 12/2000 |
| WO | 03027030 | 4/2003 |
| WO | 03097207 A1 | 11/2003 |
| WO | 2003027030 A1 | 4/2006 |
| WO | 2007135221 | 11/2007 |
| WO | 2007135221 A1 | 11/2007 |
| WO | 2008094151 A1 | 8/2008 |
| WO | 2009/004321 A2 | 1/2009 |
| WO | 2009004321 | 1/2009 |
| WO | 2009004321 A1 | 1/2009 |
| WO | 2009063128 | 5/2009 |
| WO | 2009063128 A1 | 5/2009 |
| WO | 201040048 A1 | 4/2010 |
| WO | 2010089462 A1 | 8/2010 |
| WO | 2010/097516 A1 | 9/2010 |
| WO | 2010097516 | 9/2010 |
| WO | 2010097516 A1 | 9/2010 |
| WO | 2010131982 A2 | 11/2010 |
| WO | 2011/113110 A1 | 6/2011 |
| WO | 2011/088516 A1 | 7/2011 |
| WO | 2011088516 A1 | 7/2011 |
| WO | 2011113110 | 9/2011 |
| WO | 2012026345 A1 | 3/2012 |

OTHER PUBLICATIONS

European Patent Office, Extended European Search Report issued in European application No. 13810326.2, dated Sep. 29, 2016,11 pages, European Patent Office, Helsinki, Finland.
State Intellectual Property Office of the People's Republic of China, Notification of the Second Office Action issued in Application No. 201380034064.7, dated Aug. 15, 2016, 16 pages, Beijing, China.
European Patent Office, Extended European Search Report issued in application No. 13808497, dated Feb. 11, 2016, 9 pages, European Patent Office, Munich, Germany.
European Patent Office, Extended European Search Report issued in application No. 13810173.8, dated Mar. 17, 2016, Munich, Germany.
European Patent Office; Extended European Search Report issued in application No. 13810718.0; dated Mar. 7, 2016; 6 pages; Munich, Germany.
European Patent Office, Extended European Search Report issued in application No. 13809197.0, dated Mar. 21, 2016, 9 pages, Munich, Germany.
European Patent Office; Extended European Search Report issued in application No. 13809503.9; dated Mar. 17, 2016; 6 pages; Munich, Germany.
Finnish Search report from priority Finnish Application No. 20125712, dated Apr. 8, 2013, 1 pg.
Finnish Search report from priority Finnish Application No. 20125714, dated Apr. 8, 2013., 1 pg.
Finnish Search report from priority Finnish Application No. 20125715, dated Apr. 16, 2013, 1 pg.
Finnish Search report from priority Finnish Application No. 20125717, dated Apr. 19, 2013, 1 pg.
Finnish Search report from priority Finnish Application No. 20125718, dated Apr. 19, 2013, 1 pg.
Finnish Patent and Registration Office, Opinion on Patentability issued in Application No. 20125714, dated Jan. 21, 2016, Helsinki, Finland.
International Bureau of WIPO, International Preliminary Report on Patentability issued in application No. PCT/FI2013/050640, dated Dec. 31, 2014, Geneva, Switzerland.
International Searching Authority of WIPO, Written Opinion of the International Searching Authority issued in application No. PCT/FI2013/050640, dated Sep. 20, 2013, Geneva, Switzerland.
International Bureau of WIPO, International Preliminary Report on Patentability w/ attached Written Opinion of the International Searching Authority issued in pending PCT application No. PCT/FI2013/050641, dated Dec. 31, 2014, 7 pages, World Intellectual Property Organization Geneva, Switzerland.
International Bureau of WIPO, International Preliminary Report on Patentability w/ attached Written Opinion of the International Searching Authority, issued in pending PCT application PCT/FI2013/050638, dated Dec. 31, 2014, 6 pages, World Intellectual Property Organization, Geneva, Switzerland.
International Search report from corresponding International Application No. PCT/FI2013/050637, dated Oct. 9, 2013, 3 pgs.
International Search report from corresponding International Application No. PCT/FI2013/050638, dated Sep. 20, 2013, 3 pgs.
International Search report from corresponding International Application No. PCT/FI2013/050639; dated Nov. 27, 2013, 6 pgs.
International Search report from corresponding International Application No. PCT/FI2013/050640, dated Sep. 30, 2013, 3 pgs.
International Search report from corresponding International Application No. PCT/FI2013/050641, dated Sep. 7, 2013, 3 pgs.
Miller, Graeme, Design of Mixer-Settlers to Maximize Performance:, Miller Metallurgical Services, ALTA Copper-10, May 2006, 26 pgs.
Plastic Moulding Process, Jiang Shui Qing, Li Hai Ling, Chemical Industry Publishing House, Aug. 31, 2009, pp. 172-173, Figs. 9-11.
R.J. Crawford and M.P. Kearns, Queens' University, Belfast, Introduction to the Rotational Moulding Process:, Practical Guide to Rotational Moulding, 2003, Chapter 1.
State Intellectual Property Office of the People's Republic of China; Notification of First Office Action issued in application No. 201380037892.6; dated Aug. 31, 2015, Beijing, China.
State Intellectual Property Office of the People's Republic of China, Office Action issued in Application No. 201380034067.0, dated Mar. 3, 2016, 7 Pages, Beijing, China.
State Intellectual Property Office of the People's Republic of China; First Office Action issued in application No. 201380037899.8; dated Oct. 29, 2015; 5 pages; Beijing, China.
State Intellectual Property Office of the People's Republic of China; First Office Action issued in application No. 201380034064.7, dated Nov. 3, 2015; 7 pages; Beijing, China.
State Intellectual Property Office of the People's Republic of China; Notification of First Office Action issued in Application No. 201380034124.5; dated Dec. 16, 2015; 15 pages; Beijing, China.
State Intellectual Property Office of the People's Republic of China, Office action issued in application No. 201380037888.X, dated Dec. 3, 2015, 6 pages, Beijing, China.
Taylor, Alan and Jansen, Malcolm L., "Solvent Extraction Mixer-Settler Design", Intl. Project Dev. Services Ltd., ALTA Free Paper, 10 pgs.
USPTO, Office action issued in U.S. Appl. No. 14/407,187, dated Jun. 14, 2016, 8 pages USPTO, Alexandria, VA.
USPTO, Office action issued in U.S. Appl. No. 14/408,703, dated Jun. 14, 2016, 9 pages, USPTO, Alexandria, VA.
USPTO, Office action issued in U.S. Appl. No. 14/408,711, dated Jun. 17, 2016, 11 pages; USPTO; Alexandria, VA.
Pending U.S. Appl. No. 14/407,173, filed Dec. 11, 2014.
Pending U.S. Appl. No. 14/407,187, filed Dec. 11, 2014.
Pending U.S. Appl. No. 14/407,219, filed Dec. 11, 2014.
Pending U.S. Appl. No. 14/408,703, filed Dec. 17, 2014.
Pending U.S. Appl. No. 14/408,711, filed Dec. 17, 2014.
Pending U.S. Appl. No. 14/408,398, filed Dec. 16, 2014.

(56) References Cited

OTHER PUBLICATIONS

Finnish Search report from priority Finnish Application No. 20125713, dated Apr. 10, 2013, 1 pg.
International Search report from corresponding International Application No. PCT/FI2013/050645, dated Nov. 27, 2013, 4 pgs.
European Patent Office, Partial Supplementary European Search Report; dated Apr. 25, 2016, Munich, Germany.
Canadian Intellectual Property Office, Office Action issued in Application No. 2,875,939, dated Sep. 15, 2015, Quebec, Canada.
State Intellectual Property Office of the People's Republic of China, Notification of First Office Action, issued in Application No. 201380034124.5, dated Dec. 16, 2015, Beijing, China.
Mexican Patent Office; 1st Office action in Mexican Patent Application No. MX/a/2014/015962; 6 pages (including translation); Mexico City, Mexico.
Mexican Patent Office; 1st Office action in Mexican Patent Application No. MX/a/2014/015959; 8 pages (including translation); Mexico City, Mexico.
Mexican Patent Office; Office action issued in application No. MX/2018/72970; dated Aug. 31, 2018; 5 pages; Mexican Patent Office (3 page translation attached).

\* cited by examiner

METHOD OF MANUFACTURING A SOLVENT EXTRACTION SETTLER AND SOLVENT EXTRACTION SETTLER

This is a national stage application flied under 35 USC 371 based on International Application No. PCT/FI2013/050645, filed Jun. 12, 2013 and claims priority under 35 USC 119 of Finnish Patent Application No. 20125713 filed Jun. 26, 2012.

FIELD OF THE INVENTION

The present invention relates to a method of manufacturing a solvent extraction settler to be used in hydrometallurgical liquid-liquid extraction processes for separating solutions, which are mixed in a dispersion, into different solution phases. Further, the invention relates to the solvent extraction settler.

BACKGROUND OF THE INVENTION

In a typical mixer-settler, in the first step, the aqueous and organic phases are pumped into a mixer or mixers in order to achieve a uniform liquid-liquid dispersion and a small droplet size. In The VSF® technology (stands for Vertical Smooth Flow) developed by the applicant this first step is performed in a pumpmixer called Dispersion Overflow Pump (DOP®) (disclosed e.g. in document U.S. Pat. No. 5,662,871) and in a set of two SPIROK® helical mixers (disclosed in e.g. document U.S. Pat. No. 5,185,081). After mixing, the dispersion is fed into a settler. The settler is typically a large tank which is square in plan and its square area is about several hundred square meters. Dispersion is fed into the settler at the front end of the settler. A distributor fence is arranged at the feed end of the settler to distribute the flow of the dispersion to the whole width of the settler. In the settler, the dispersion moves towards the settler back wall and, at the same time, the phases separate by gravity into two layers with a dispersion band remaining between them. Typically, separation fences are arranged in the settler tank to enhance coalescence of the dispersion. In the VSF® technology the separation fences are so-called DDG® fences (Dispersion Depletor Gate) (disclosed e.g. in document U.S. Pat. No. 7,517,461). At the rear end of the settler, an adjustable weir and launders are used to control the vertical position of the phase interface and to collect and discharge both phases, respectively. Arrangements of launders are disclosed e.g. in documents WO 97/40901, WO 2009/063128 A1 and WO 2010/097516 A1.

The settler tank is normally built on the site. WO 2007/135221 A1 discloses one method for manufacturing a mixer-settler on site. Wall structures are connected by vertical support columns to the bottom plate. The wall structure is formed by fastening a required number of horizontal support beams to the vertical support columns at regular intervals. A required number of plate-like wall elements made of a chemically resistant material are attached to the horizontal support beams inside the mixer-settler, so that they form a load-bearing structure in the spaces left between the horizontal support beams. The plate-like wall elements are connected to the plate-like element covering the bottom plate of the mixer-settler. However, as mentioned, such a settler is still a large tank which is square in plan and its square area is about several hundred square meters.

So far, a solvent extraction plant has been project specified. In each case the layout of the plant and the equipment have been unique. There has not been a possibility for the productization of settlers. Settlers known in the prior art require most of the construction work to be done at site. This causes problems because of the crucial influence of local factors. It has been difficult to control the quality of the site work by local suppliers. Conventional settlers are normally permanent structures. At the end of their often relatively short life cycle it is not possible to recycle the settler by dismantling it and then building it up again to be used at another site. WO 2009/004321 A1 discloses a small-scale settler tank being dimensioned to be sufficiently small that it may be transported by a conventional truck and trailer without a need for specialist transport vehicles. This is enabled by dimensioning the complete settler tanks such that they are not larger than a shipping container. The settler tank may be dimensioned so that it fits inside a shipping container. However, the problem is that the settler tank itself does not provide standard shipping container characteristics, such as a self-supporting structure to provide handling and stacking capability.

OBJECT OF THE INVENTION

The object of the invention is to eliminate the disadvantages mentioned above.

In particular, it is an object of the present invention to provide a method of manufacturing a modular solvent extraction settler and a modular settler in which the individual, in workshop pre-fabricated, shipping container compatible modules provide shipping container standard compatible transportability, stacking capability, modularity and scalability of the settler design.

It is also an object of the present invention to provide a method for manufacturing a modular solvent extraction settler and a modular settler which enable the construction work at the installation site to be be kept at a minimum, resulting in low installation costs and good quality.

Further, it is an object of the present invention to provide a settler which can be easily disassembled and re-located.

Further, it is an object of the present invention to provide a settler which can be delivered first as a pilot plant and later expanded to a full size solvent extraction plant.

Further, it is an object of the present invention to provide a settler wherein individual settler modules can be maintained and replaced without interruption of the whole process.

SUMMARY OF THE INVENTION

According to a first aspect, the present invention provides a method of manufacturing a solvent extraction settler to be used in hydrometallurgical liquid-liquid extraction processes for separating solutions mixed in a dispersion into different solution phases. According to the invention the method comprises the steps of:
  manufacturing at the site of manufacture, such as in an engineering workshop, a plurality of self-supporting settler element modules each having exterior dimensions, strength and handling and securing means conforming to shipping container standards,
  transporting the modules to the site of installation as normal freight by normal transport equipment, such as trucks, trailers and container ships, capable of handling and transporting shipping container standard compatible units, and
  assembling the modules into a complete settler at the site of installation.

According to a second aspect, the present invention provides a solvent extraction settler used in hydrometallurgical liquid-liquid extraction processes for separating solutions mixed in a dispersion into different solution phases. According to the invention the settler comprises a module group consisting of a plurality of self-supporting settler element modules each having exterior dimensions, strength and handling and securing means conforming to ISO shipping container standards to enable compatible transportability.

The advantage in that the settler element modules can be manufactured in the factory environment, which is different from the installation site environment, is the providing of good quality. The settler modules being shipping container standard compatible units provides all benefits of the normal shipping containers: they can be handled with normal transport equipment and there is no need for oversize transport equipment. The settler element modules having dimensions, strength and handling and securing means conforming to shipping container standards thus have all the benefits of the transportability of normal shipping containers. The settler modules can be transported on land by trucks and trailers and with container ships by sea. In ports they can be handled with normal container handling equipment. A complete solvent extraction plant, which may comprise one or more settlers, can be shipped in one delivery. The modules have the strength and durability to withstand stacking of a number of modules one on top of the other. The settler can easily be re-located and recycled by disassembling the modules at one site and re-assembling them into a settler located at another site.

In one embodiment of the settler, the module comprises a self-supporting framework structure having a shape of a rectangular parallelepiped with exterior dimensions and corner fittings conforming to shipping container standards, said corner fittings being attached to each corner of the framework structure, and a shell, said shell being supported inside the framework structure and forming at least a part of a flow path for the solutions flowing in the settler.

In an embodiment of the settler, the module conforms to ISO shipping container standards to enable ISO compatible transportability.

In an embodiment of the settler, the module conforms to standard ISO 668 Series 1 "Freight containers—Classification, dimensions and ratings"; and the corner fittings (6) conform to standard ISO 1161 Series 1 "Freight containers—Corner fittings—specification". The strength of the modules conforms to standard ISO 1496/1, Annex A. The strength of the corner fittings conforms to standard ISO 1161.

In an embodiment of the settler, the shell is a hollow body made of a fibre-reinforced plastic composite. Preferably, the shell is manufactured by filament winding technology. The shell or shells connected to each other form a tubular flow path for the dispersion and solutions which is gastight. The gas-tight sealed construction eliminates oxidation of the reagent by air and thus lowers make-up costs. The gas-tight construction also decreases evaporation of the reagent, decreasing the release of Volatile Organic Compounds (VOC) to the environment. In addition, this construction enables the use of inert gases (like nitrogen) or protects against the release of toxic gases (like hydrogen sulfide). Manufacturing of the shell made of a fibre-reinforced plastic composite by filament winding gives the shell a required strength with a wall thickness of e.g. 8 mm. The inner surface of the shell, which in operation comes to contact with the dispersion and solvents, is inherently smooth because it is formed against a mandrel which has a smooth surface. The smooth surface contacting the solvent flow minimizes local turbulences and enhances phase coalescence. The smooth surface also minimizes electrostatic charging and thereby reduces the risk for fires due to igniting of volatile organic compounds in the inner atmosphere of the shell caused by electrostatic discharge. Electrostatic charging can also be reduced by adding carbon staple fibers to the plastic composite. Automated filament winding of the shell enables lower fabrication costs compared to any other manufacturing method, such as hand laminating.

The shell is supported inside the framework structure, which enables support against the hydrostatic pressure, allowing a low material thickness for the shell.

In an embodiment of the settler, the module group comprises at least one, preferably more, module in-line series in which the modules are sequentially connected to each other in-line to form a uniform plug flow path for the dispersion and solutions flowing in the settler In the process, as the flow is separated into parallel module in-line series, it is possible to maintain the settler section by section by simply shutting off the particular module in-line series having the module which is to be maintained without having to interrupt the process. The process may continue to be running in other module in-line series. Further, better process performance can be obtained with high plug flow characteristics. As the dispersion and solutions are flowing in several module in-line series instead of flowing in one large tank, the specific surface area is much larger, thereby improving phase separation. The modular structure also enables flexible capacity since more capacity can be built while the solvent extraction plant is running by increasing the number of module in-line series.

In an embodiment of the settler, the module group comprises two or more module in-line series arranged in parallel side-by-side with each other. The side-by-side arrangement of the module in-line series is advantageous because thereby the settler can be made compact and the foundation can be implemented by a plurality of pillars supporting each corner of the modules. One pillar may support one to four corners of the modules.

In an embodiment of the settler, the module in-line series comprises a coalescing module having one or more coalescing fence elements to coalesce the dispersion into different solutions phases.

In an embodiment of the settler, the module in-line series comprises a launder module arranged to feed dispersion to the coalescing module.

In an embodiment of the settler, the module in-line series comprises a launder module which is arranged to receive and discharge the separated solutions.

In an embodiment of the settler, the module in-line series comprises at least one retention module to increase residence time in the settler for enhancing the phase separation, said retention module being arranged between the coalescing module and the launder module.

In an embodiment of the settler, the cross-section of the shell of the coalescing module is equal to the cross section of the shell of the retention module to enable abutting joint of the shells.

The shells of the coalescing and retention modules are tubular closed structures whereby the inner atmosphere of the shells is isolated from the outer atmosphere. This has many advantages. Mist emissions cannot escape from the atmosphere in the interior of the shells to the outer atmosphere to contaminate the air and worsen the working conditions. Likewise, the surrounding air and e.g. insects and birds cannot enter the shells. In addition, when the lighter solution is an organic phase, the oxidation degree of the organic phase decreases whereby solution costs are reduced. In operation, the atmosphere of the settler above the liquid surface is flammable because it contains volatile organic compounds which are released from the hydrocarbon based solvents. The gas-tight closed compartments of the tubular shells provide fire protection against accidental fires.

In an embodiment of the settler, the shell of the coalescing module and/or the retention module has a substantially rectangular cross-sectional shape with cambered corners and convexly outwards curved side walls. Such a cross-section form enables the shell to be as large as possible, still remaining inside the framework structure and still being able to be manufactured by filament winding.

In an embodiment of the settler, the launder module comprises a tubular first shell of a fibre-reinforced plastic composite to receive and conduct the overflow of a lighter solution phase. The launder module further comprises a tubular second shell of a fibre-reinforced plastic composite to receive and conduct the underflow of a heavier solution phase.

In an embodiment of the settler, the launder module is a combined feed and discharge launder comprising a tubular third shell of a fibre-reinforced plastic composite to feed dispersion to modules of a next settler.

In an embodiment of the settler, the settler comprises two or more parallel module in-line series with side-by side arranged launder modules. The first shells of the adjacent launder modules are abutting and connected to each other to form a first flow channel which is in the crosswise direction to the direction of the flow path in the module in-line series. The second shells of the adjacent discharge launder modules are abutting and connected to each other to form a continuous second flow channel which is in the crosswise direction to the direction of the flow path in the module in-line series.

In an embodiment of the settler, the first shells are conical so that the sequentially connected first shells of the launder modules in the plurality of module in-line series together form the conical first flow channel.

In an embodiment of the settler, the second shells are conical so that the sequentially connected second shells of the launder modules in a plurality of module in-line series together form the conical second flow channel.

In an embodiment of the settler, the third shells are conical so that the sequentially connected third shells of the launder modules in a plurality of module in-line series together form a conical third flow channel.

The first, second and third flow channels are all tubular closed compartments which have many advantages. As an essentially closed structure the inner atmosphere of the launders can be isolated from the outer atmosphere so that mist emissions cannot escape from the atmosphere in the interior of the launders to the outer atmosphere to contaminate the air and worsen the working conditions. Likewise, the surrounding air and e.g. insects and birds cannot enter the launders. In addition, when the lighter solution is an organic phase, the oxidation degree of the organic phase decreases whereby solution costs are reduced.

In an embodiment of the settler, the module group comprises a box module comprising a first discharge box supported inside the framework structure for receiving and discharging the lighter solution phase from the first flow channel, and a second discharge box supported inside the framework structure for receiving and discharging the heavier solution phase from the second flow channel.

The conical first and second flow channels which form discharge channels for the lighter solution (normally organic) and the aqueous solution have many inlets along their length. The cross section of the conical first and second flow channels increases and the bottom is inclined downwards towards the first and second discharge boxes. After each inlet the flow rate in the first and second flow channels increases. In a conical launder the flow rate remains the same for the whole length of the launder and no return eddies and standing flows are created. Thereby crud accumulation is avoided if the solutions contain solids.

In an embodiment of the settler, the box module comprises a feed box supported inside the framework structure for feeding dispersion to the third flow channel.

The conical third channel which forms a feed launder for the dispersion has a cross section which decreases from the end connected to the feed box towards its other end which is distant from the feed box. This has the advantage that the delay time distribution of the dispersion in the feed launder is uniform so that no standing zones, in which the dispersion would separate, are formed. The bottom of the third flow channel is inclined downwards towards the feed box, whereby the aqueous solution separated from the dispersion in the feed launder flows back to the mixer via the feed box.

In an embodiment of the settler, the framework structure comprises a first end frame comprising: a horizontal first lower beam; a horizontal first upper beam at a distance from the first lower beam; a vertical first corner post which is fixedly connected to a first end of the first lower beam, defining a first corner, the vertical first corner post being fixedly connected to a first end of the first upper beam, defining a second corner; and a vertical second corner post at a distance from the first corner post, the vertical second corner post being fixedly connected to a second end of the first lower beam, defining a third corner, the vertical second corner post being fixedly connected to a second end of the first upper beam, defining a fourth corner. Further, the framework structure comprises a second end frame comprising a horizontal second lower beam; a horizontal second upper beam at a distance from the second lower beam; a vertical third corner post which is fixedly connected to a first end of the second lower beam, defining a fifth corner, the vertical third corner post being fixedly connected to a first end of the second upper beam, defining a sixth corner; and a vertical fourth corner post at a distance from the third corner post, the vertical fourth corner post being fixedly connected to a second end of the second lower beam, defining a seventh corner, the vertical fourth corner post being fixedly connected to a second end of the second upper beam, defining an eighth corner. Further, the framework structure comprises a first bottom side rail fixedly connected to the first end frame at the first corner and to the second end frame at the fifth corner; a second bottom side rail fixedly connected to the first end frame at the third corner and to the second end frame at the seventh corner; a first top side rail fixedly connected to the first end frame at the second corner and to the second end frame at the sixth corner; a second top side rail fixedly connected to the first end frame at the fourth corner and to the second end frame at the eighth corner; bottom cross members fixedly connected between and to the first and second bottom side rails; top cross members fixedly connected between and to the first and second top side rails; side cross members fixedly connected between and to the bottom side rails and the top side rails. A corner fitting is attached to each of the first corner, second corner, third corner, fourth corner, fifth corner, sixth corner, seventh corner and eighth corner.

In an embodiment of the settler, the settler comprises a foundation on which the module group is supported at a height above the ground level thereby providing a space for piping and access below the settler.

In an embodiment of the settler, the foundation comprises a plurality of pillars having ISO shipping standard compatible container lashing fittings to which the corner fittings of the modules are connected. The installation of the settler on pillars has the advantage that minimal amount of excavation work is needed. The installation on pillars also makes it possible to speed up the installation and shortens the project lead time. Pillars also allow easy assembly and disassembly of the modules and settlers. When more capacity is needed for the settler, it is easy to increase capacity by simply adding more pillars for the installation of more module in-line series. The increasing of capacity can be done while the solvent extraction process is running.

In an embodiment of the settler, the pillar comprises a lower end which is supported on the ground, an upper end, and one or more container lashing fittings attacked to the upper end of the pillar.

In an embodiment of the settler, the container lashing fitting comprises a stacking cone.

In an embodiment of the settler, the container lashing fitting comprises a twist lock.

In an embodiment of the settler, the pillar comprises one to four container lashing fittings depending on the number of corner fittings to be connected onto the pillar.

In an embodiment of the settler, the pillar comprises a plastic tube, a concrete reinforcement arranged inside the plastic tube, cast concrete cast inside the plastic tube, and a metal base plate attached at the upper end of the pillar, to which base plate one or more container lashing fittings are fixedly connected.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
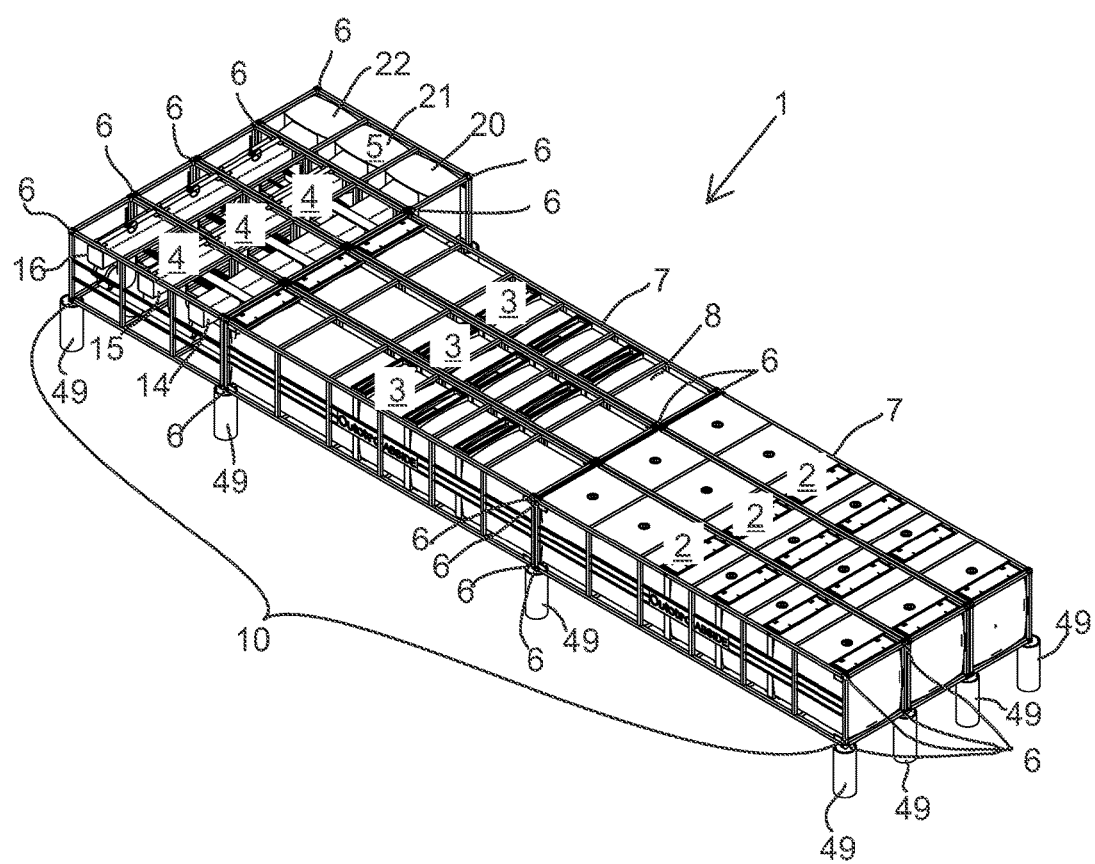
FIG. 1 is an axonometric view of a solvent extraction settler according to a first embodiment of the present invention.

FIG. 1 shows one embodiment of a solvent extraction settler which is used in hydrometallurgical liquid-liquid extraction processes for separating solutions mixed in a dispersion into different solution phases. The dispersion pump and mixers which are used to prepare the dispersion are not shown in the Figures. The settler comprises a module group 1 consisting of a plurality of self-supporting settler element modules 2, 3, 4, 5. Each of the settler element modules 2, 3, 4, 5 has exterior dimensions, strength and handling and securing means 6 which conform to ISO shipping container standards to enable ISO compatible transportability. In particular, each module 2, 3, 4, 5 comprises a self-supporting framework structure 7 having a shape of a rectangular parallelepiped with exterior dimensions and corner fittings 6 conforming to ISO shipping container standards. The corner fittings 6 are attached to each eight corners of the framework structure 7. A shell 8, 14, 15, 16 which is made of a fibre-reinforced plastic composite is supported inside the framework structure 7. Preferably the shells 8, 14, 15, 16 are made by filament winding technology. The shells 8, 14, 15, 16 in the modules 2, 3, 4, 5 form at least a part of a flow path for the solutions flowing in the settler. Each module 2, 3, 4, 5 conforms to standard ISO 668 Series 1 "Freight containers—Classification, dimensions and ratings". The corner fittings 6 conform to standard ISO 1161 Series 1 "Freight containers—Corner fittings—specification".

FIGS. 1 to 4 illustrate the flexibility and scalability of the modular settler design.

Figure 10:
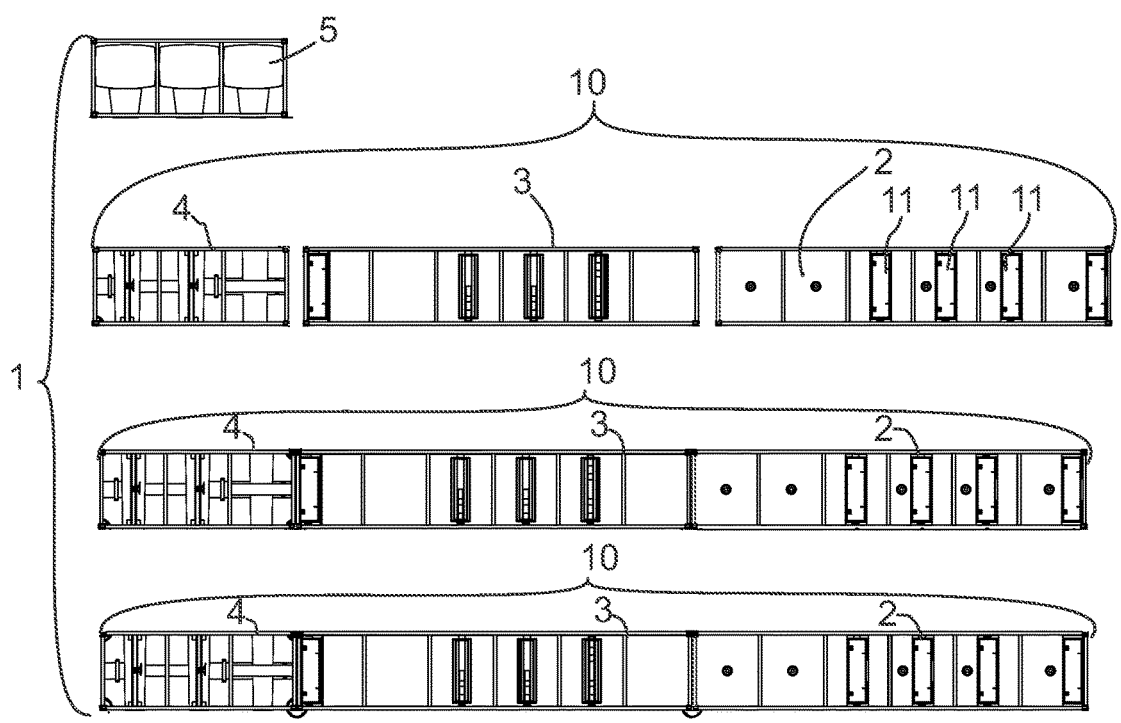
FIG. 10 is a plan exploded view of the settler of FIG. 1.

With reference to the small settler shown in FIGS. 1 and 10, the module group 1 forming the settler comprises three module in-line series 10 arranged in parallel side-by-side. In each of the module in-line series 10 the modules 2, 3, 4, 5 are sequentially connected to each other in-line to form a plug flow path for the dispersion and solutions flowing in the settler. Each module in-line series 10 has an individual inlet feed of dispersion (not shown in Figs.) and performs the phase separation independent from other module inline-series. Therefore, a module in-line series 10 can be shut off without interrupting the process running in other module in-line series 10.

Figure 2:
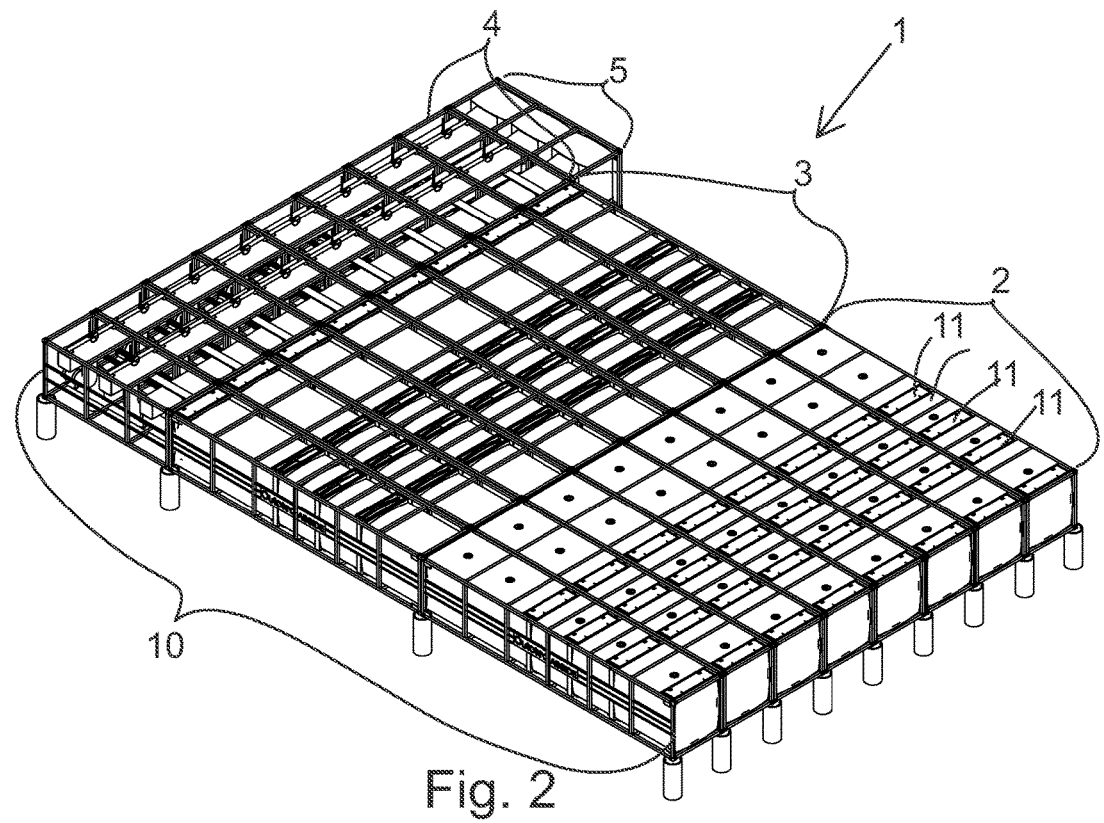
FIG. 2 is an axonometric view of a solvent extraction settler according to a second embodiment of the present invention.
Figure 3:
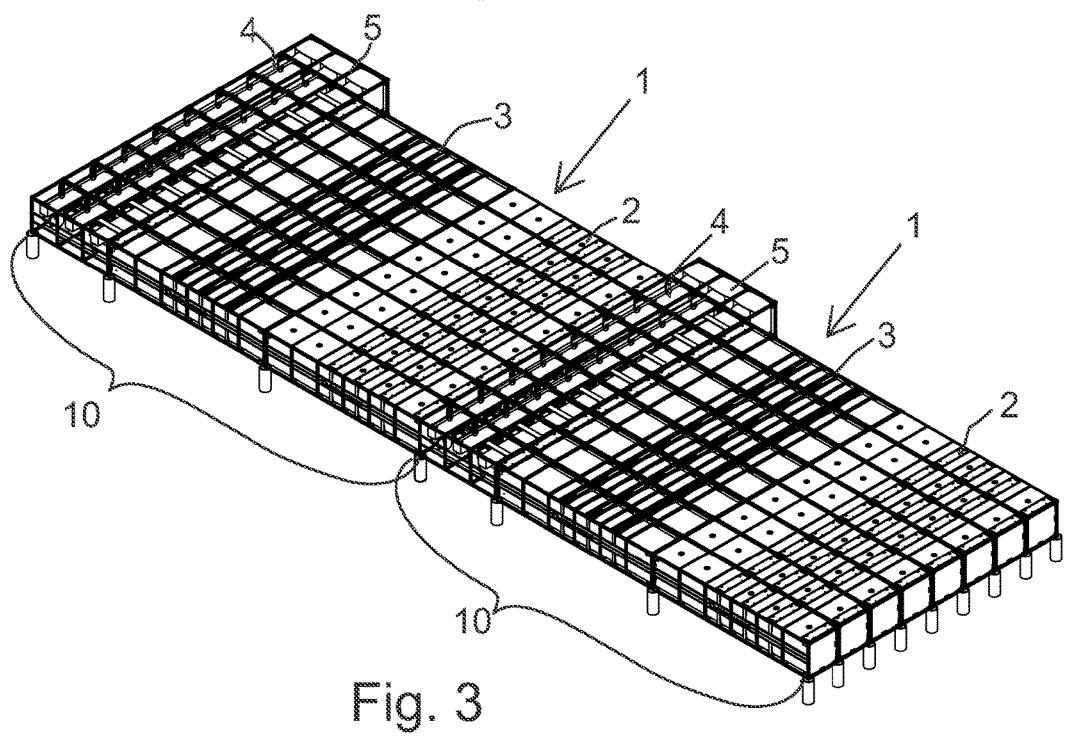
FIG. 3 is an axonometric view of a solvent extraction settler according to a third embodiment of the present invention.
Figure 4:
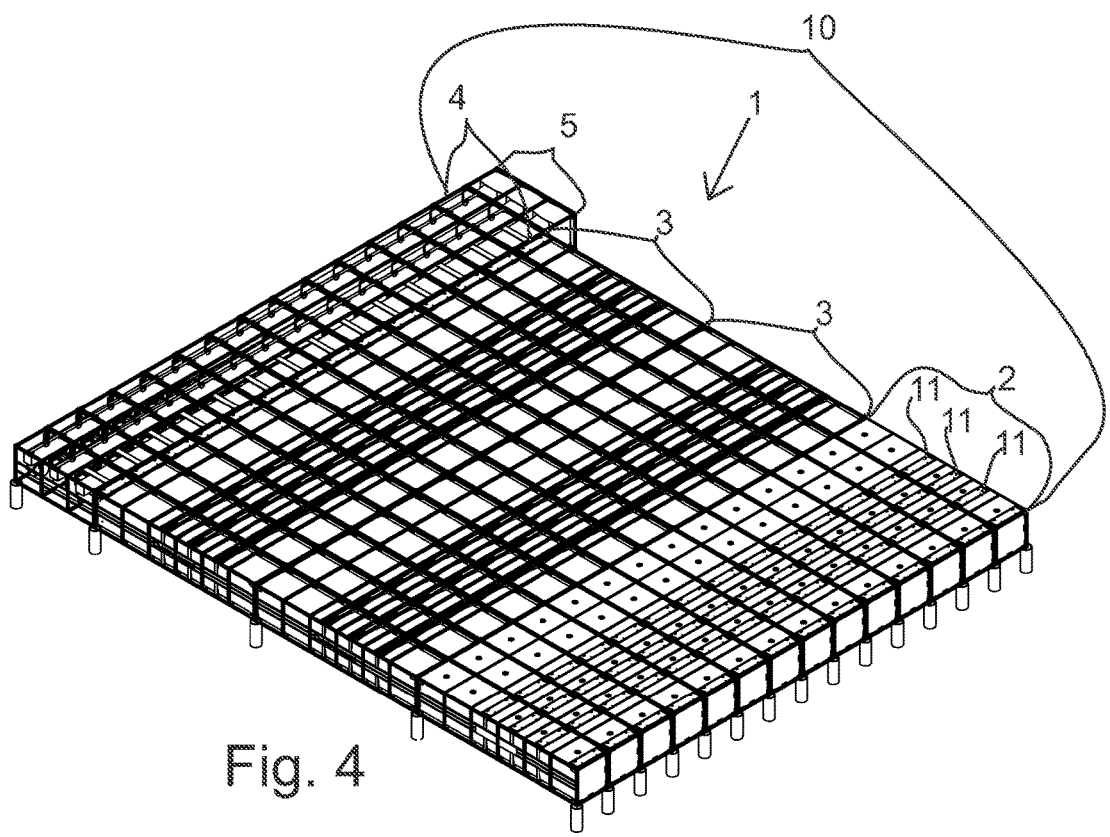
FIG. 4 is an axonometric view of a solvent extraction settler according to a fourth embodiment of the present invention.

In another not shown embodiment the settler intended for a pilot purpose could consist of only one module in-line series 10. Such a pilot plant can easily be expanded to a larger scale solvent extraction plant. In FIG. 2 there is shown a settler consisting of eight module in-line series 10 arranged in parallel side-by-side. FIG. 3 shows an embodiment of the solvent extraction plant having two sequentially interconnected settlers of FIG. 2. FIG. 4 shows a large settler consisting of fourteen in parallel side-by-side arranged module in-line series 10.

At the minimum the module in-line series 10 may comprise only one coalescing module 2 connected to a launder module 4.

Referring to FIGS. 1 and 10, the module in-line series 10 comprises a coalescing module 2 having three coalescing fence elements 11 to coalesce the dispersion into different solutions phases. Further, the module in-line series 10 comprises a retention module to increase residence time in the settler for enhancing the phase separation. The retention module 3 is arranged between the coalescing module 2 and a launder module 4. In the settler of FIG. 4 each of the fourteen module in-line series 10 comprises two retention modules 3 between the coalescing module 2 and the launder module 4.

Figure 8:
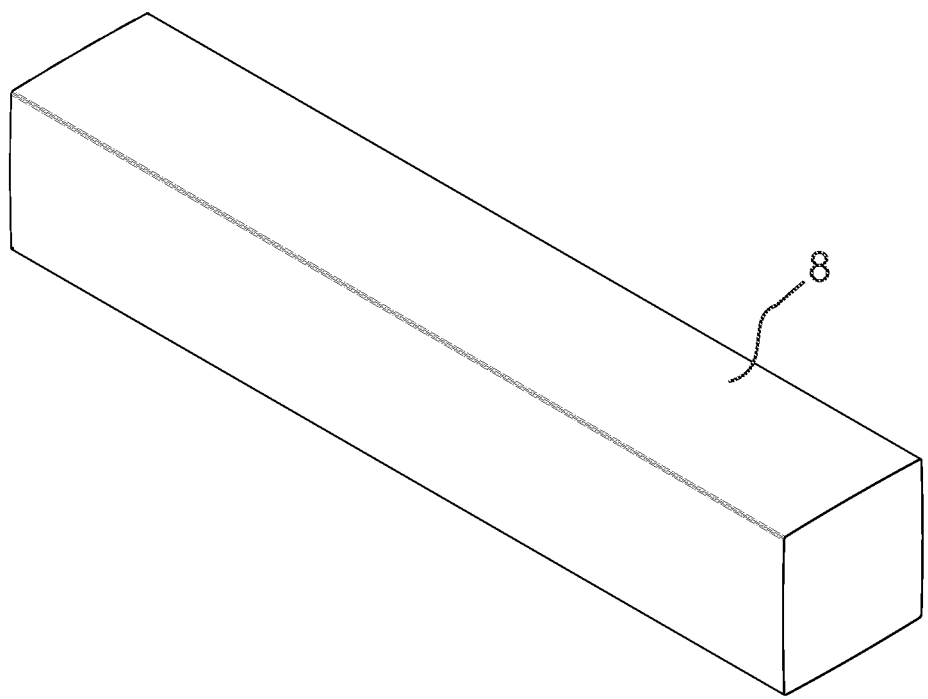
FIG. 8 is an axonometric view of the shell of the settler element module of FIG. 5.
Figure 9:
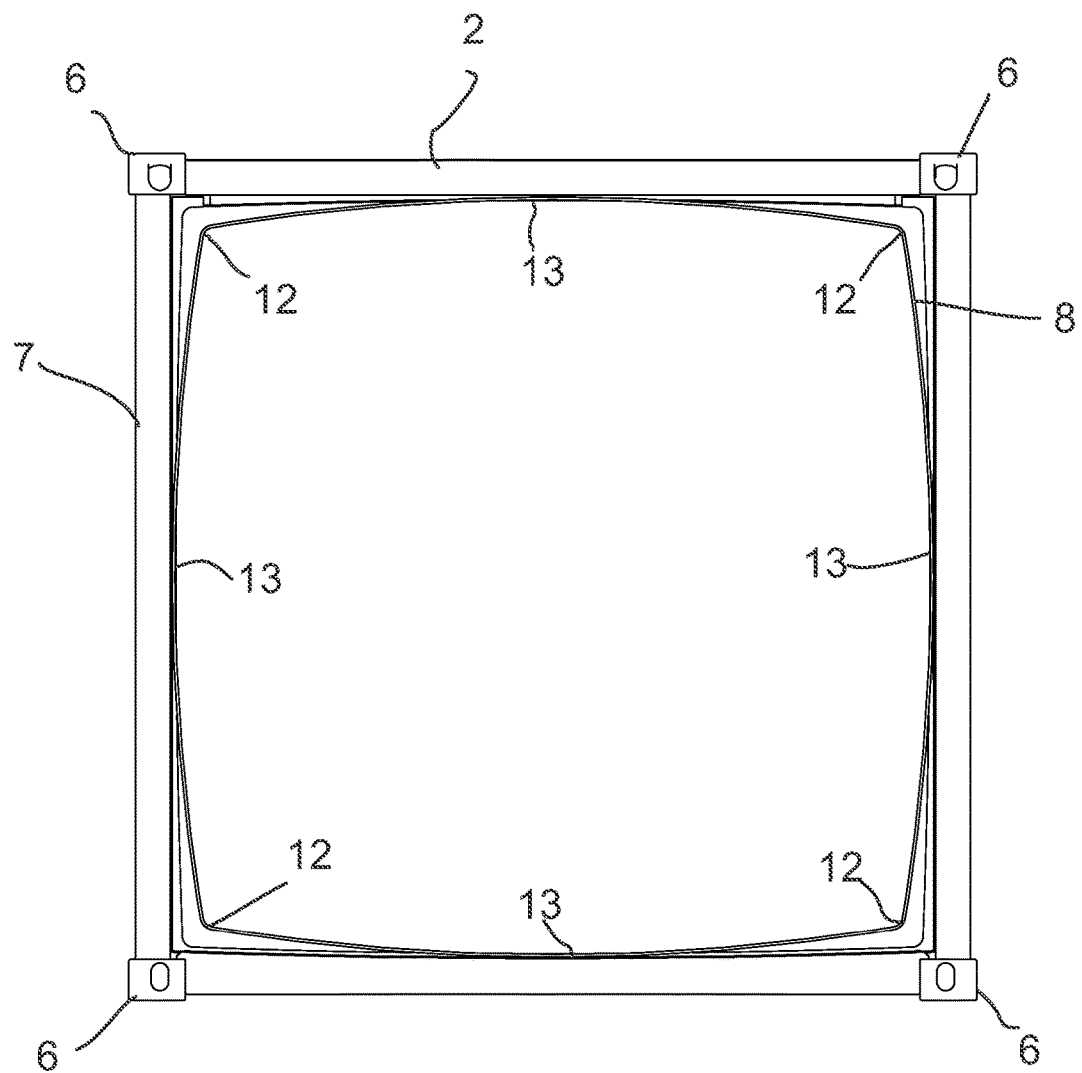
FIG. 9 is an end view of the settler element module of FIG. 5.

As shown in FIGS. 8 and 9 the cross-section of the shell 8 of the coalescing module 2 is equal to the cross section of the shell 8 of the retention module 3 to enable abutting joint of the shells 8. The shell 8 of the coalescing module 2 and/or the retention module 3 has a substantially rectangular cross-sectional shape with cambered corners 12 and convexly outwards curved side walls 13. This kind of cross-section shape enables manufacturing of the shell 8 with filament winding technology. The shell 8 may also have any other suitable cross-section shapes; it can be circular or oval or a polygon.

Figure 5:
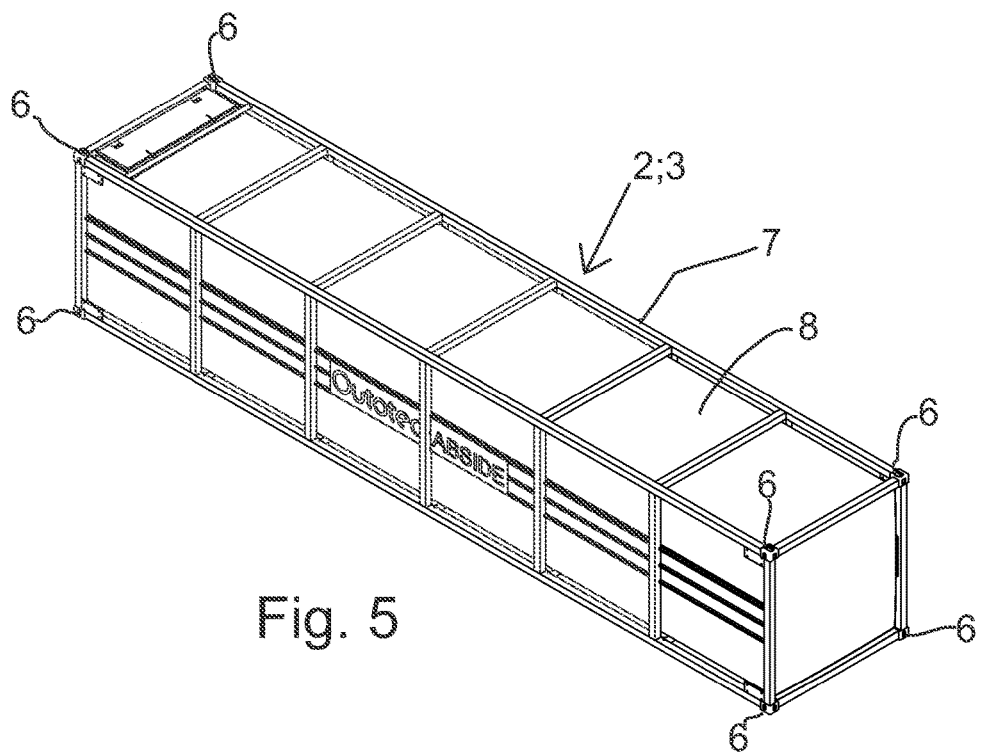
FIG. 5 is an axonometric view of one settler element module of a settler according to one embodiment of the invention.
Figure 6:
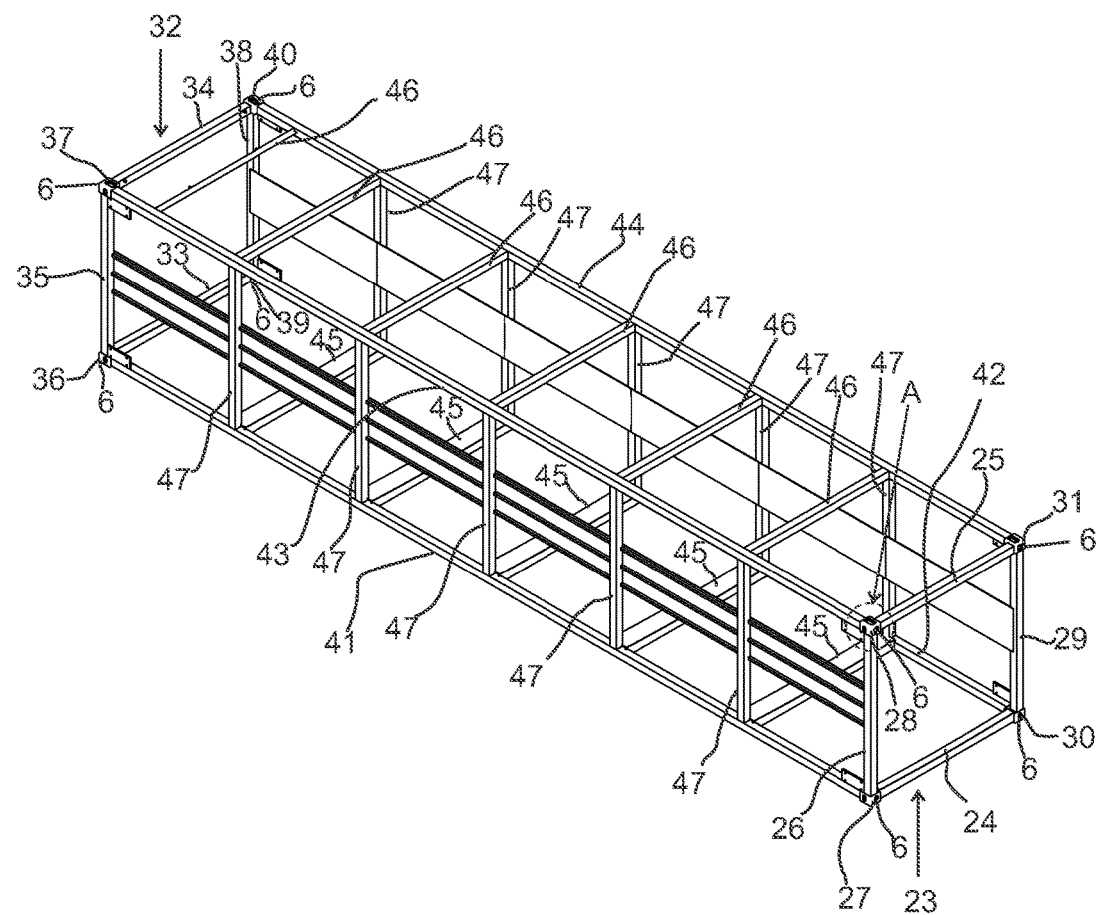
FIG. 6 is an axonometric view of the framework structure of the settler element module of FIG. 5.

As shown in FIGS. 5 and 6 the framework structure 7 encompassing the shell 8 may have the following structure. The framework structure 7 comprises a first end frame 24 comprising a horizontal first lower beam 23, a horizontal first upper beam 25 at a distance from the first lower beam, a vertical first corner post 26 which is fixedly connected to a first end of the first lower beam 24, defining a first corner 27, the vertical first corner post 26 being fixedly connected to a first end of the first upper beam 25, defining a second corner 28, a vertical second corner post 29 at a distance from the first corner post 26, the vertical second corner post being fixedly connected to a second end of the first lower beam 24, defining a third corner 30, the vertical second corner post being fixedly connected to a second end of the first upper beam 25, defining a fourth corner 31. The framework structure 7 comprises a second end frame 32 comprising a horizontal second lower beam 33, a horizontal second upper beam 34 at a distance from the second lower beam 33, a vertical third corner post 35 which is fixedly connected to a first end of the second lower beam 33, defining a fifth corner 36, the vertical third corner post 35 being fixedly connected to a first end of the second upper beam 34, defining a sixth corner 37, and a vertical fourth corner post 38 at a distance from the third corner post 35, the vertical fourth corner post being fixedly connected to a second end of the second lower beam 33, defining a seventh corner 39, the vertical fourth corner post being fixedly connected to a second end of the second upper beam 34, defining an eighth corner 40. A first bottom side rail 41 is fixedly connected to the first end frame 23 at the first corner 27 and to the second end frame 32 at the fifth corner 36. A second bottom side rail 42 is fixedly connected to the first end frame 23 at the third corner 30 and to the second end frame 32 at the seventh corner 39. A first top side rail 43 is fixedly connected to the first end frame 23 at the second corner 28 and to the second end frame 32 at the sixth corner 37. A second top side rail 44 is fixedly connected to the first end frame 23 at the fourth corner 31 and to the second end frame 32 at the eighth corner 40. Bottom cross members 45 are fixedly connected between and to the first and second bottom side rails 41, 42. The bottom cross members 45 may be shaped as cradles which conform to the outer shape of the shell 8. Top cross members 46 are fixedly connected between and to the first and second top side rails 43, 44. Side cross members 47 are fixedly connected between and to the bottom side rails 41, 42 and the top side rails 43, 44. A corner fitting 6 is attached to each of the first corner 27, second corner 28, third corner 30, fourth corner 31, fifth corner 36, sixth corner 37, seventh corner 39 and eighth corner 40.

The framework structure 7 conforms to standard ISO 668 Series 1 "Freight containers—Classification, dimensions and ratings". The framework structure 7 of the coalescing module 1 and retention module 3 may preferably have an external length of 12.192 m (40 ft) and a width of 2.438 m (8 ft). The framework structure 7 of the launder module 4 and the box module 5 (see FIG. 16) may have an external length of 6.058 m (20 ft).

Figure 7:
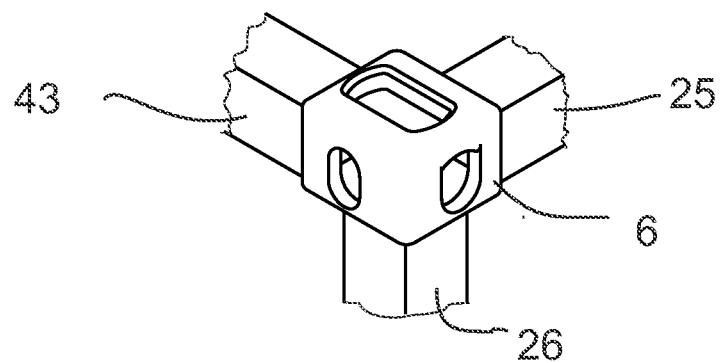
FIG. 7 is an axonometric view of detail A of FIG. 6.

FIG. 7 shows a corner fitting 6 fixedly connected to a corner of the framework structure 7. The corner fittings 6 conforms to standard ISO 1161 Series 1 "Freight containers—Corner fittings—specification". The corner fitting 6 has a connecting hole at each of its three sides.

With reference to FIGS. 10 to 14, the launder module 4 may have two functions. It may be arranged to feed dispersion to the coalescing module 2 of the next settler (see FIG. 3) and it may be arranged to receive and discharge the separated solutions obtained from the coalescing and/or retention modules 2, 3.

The launder module 4 comprises a self-supporting framework structure 7 having a shape of a rectangular parallelepiped with exterior dimensions and corner fittings 6 conforming to ISO shipping container standards, said corner fittings being attached to each corner of the framework structure. The launder module 4 comprises a first shell 14 of a fibre-reinforced plastic composite to receive and conduct the overflow of a lighter solution phase, and a second shell 15 of a fibre-reinforced plastic composite to receive and conduct the underflow of a heavier solution phase. Further, the launder module 4 comprises a third shell 16 of a fibre-reinforced plastic composite to feed dispersion to the modules of a next settler. The shells 14, 15 and 16 may preferably be manufactured by filament winding technology.

Figure 11:
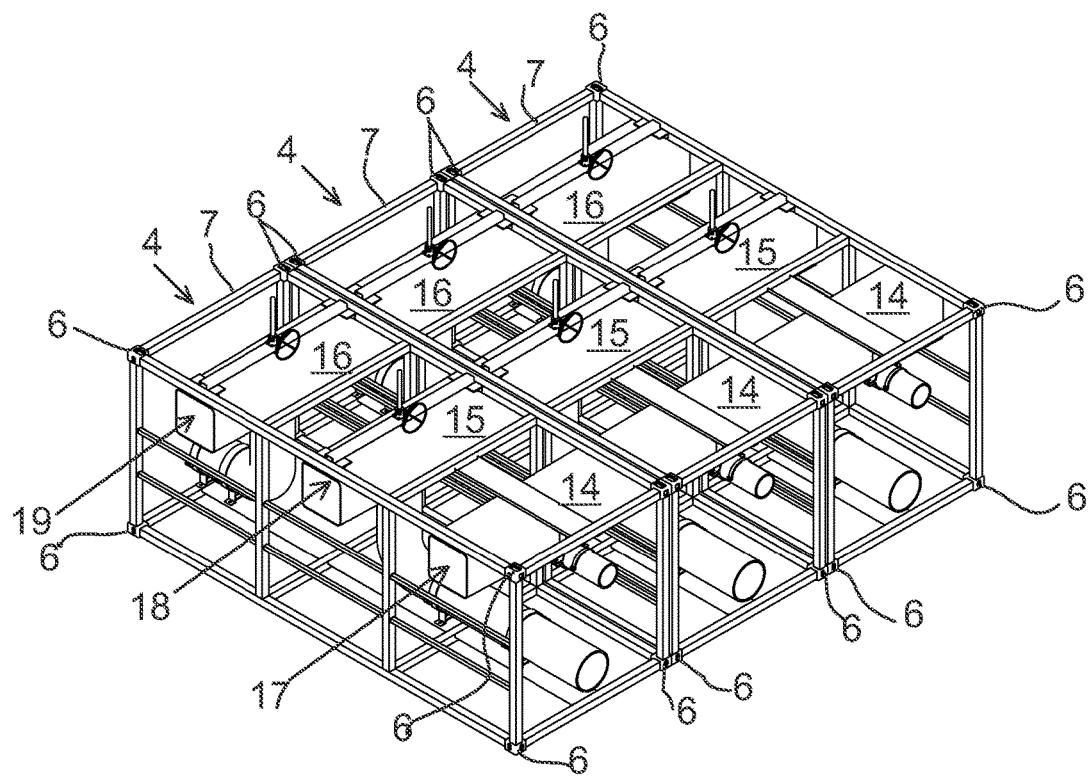
FIG. 11 is an axonometric view of the three interconnected launder modules of the settler of FIG. 1.
Figure 12:
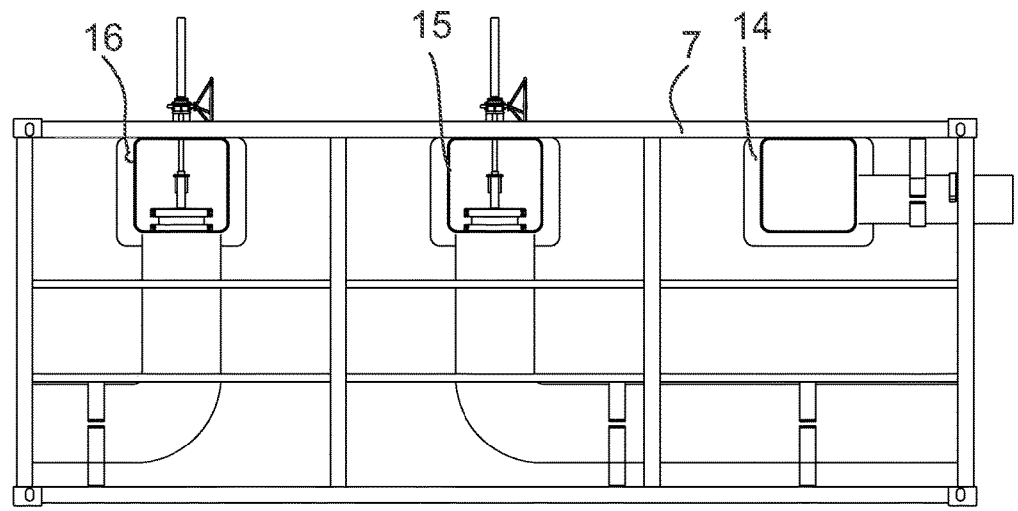
FIG. 12 is a side view of the launder module of FIG. 11.
Figure 13:
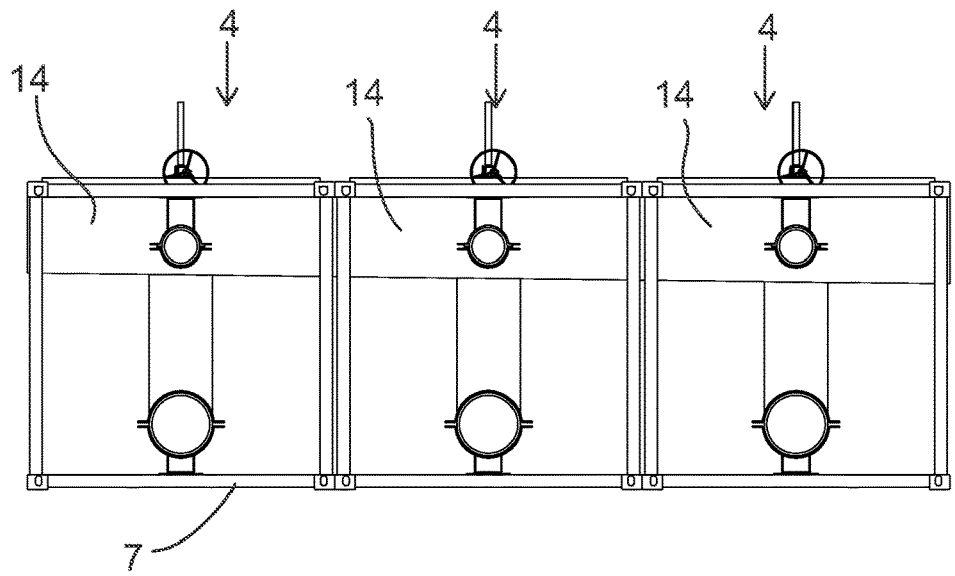
FIG. 13 is an end view of the three interconnected launder modules of FIG. 11.

In FIG. 11 the three side-by side arranged launder modules 4 are connected to each other so that the first shells 14 of the adjacent launder modules 4 are abutting and connected to each other to form a first flow channel 17 which is in the crosswise direction to the direction of the flow path in the module in-line series 10. The second shells 15 of the adjacent launder modules are abutting and connected to each other to form a continuous second flow channel 18 which is in the crosswise direction to the direction of the flow path in the module in-line series 10. Further, the third shells 16 of the adjacent launder modules are abutting and connected to each other to form a continuous third flow channel 19 which is in the crosswise direction to the direction of the flow path in the module in-line series 10.

Figure 14:
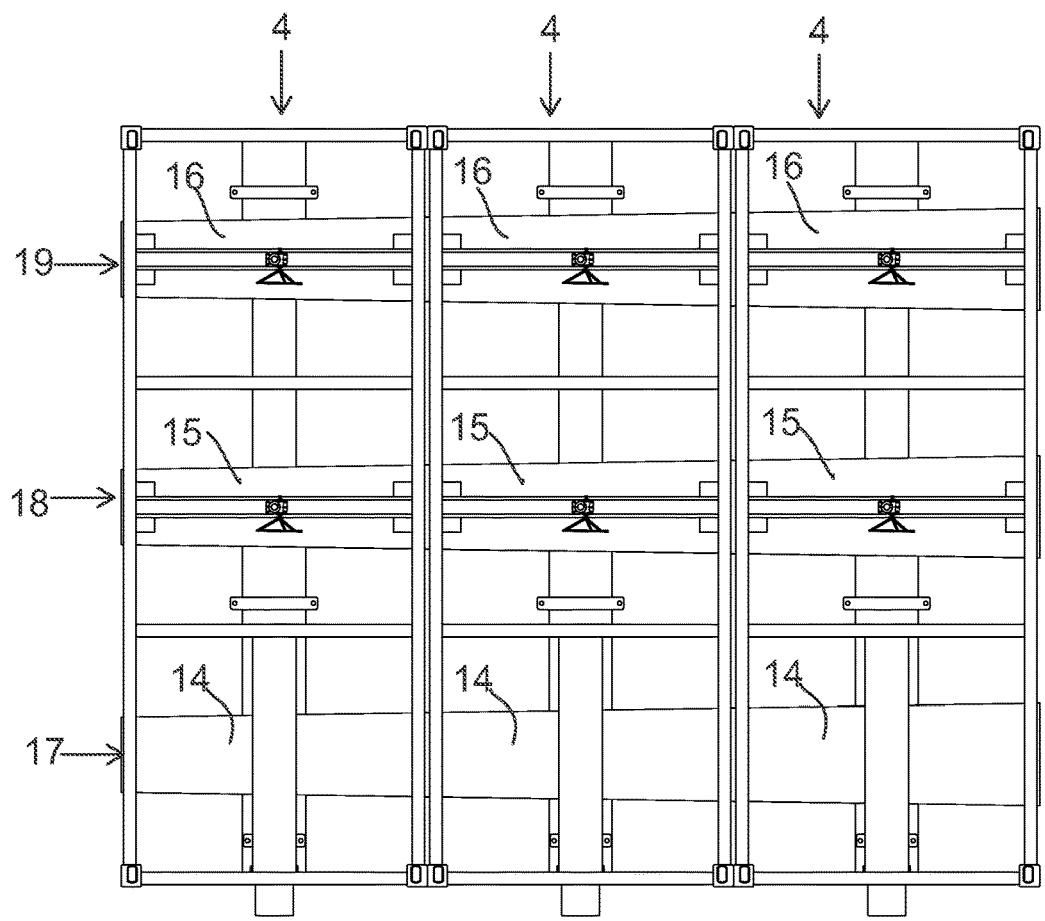
FIG. 14 is a plan view of the three interconnected launder modules of FIG. 11, seen from above.
Figure 15:
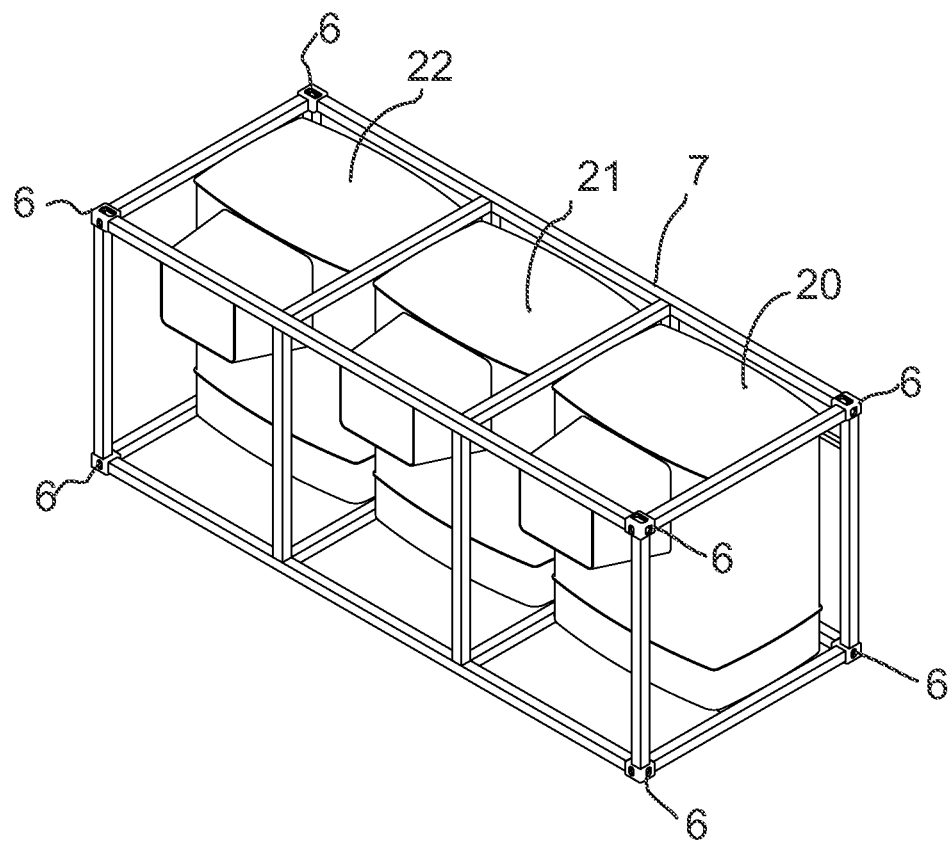
FIG. 15 is an axonometric view of the box module of the settler of FIG. 1.

As can be seen in FIGS. 11 and 14, the first shells are conical so that the sequentially connected first shells 14 of the launder modules 4 together form the conical first flow channel 17 to conduct the lighter solution phase. The second shells 15 are conical so that the sequentially connected second shells 15 of the launder modules together form the conical second flow channel 18 to conduct the heavier solution phase. The third shells 16 are conical so that the sequentially connected third shells 16 of the launder modules 4 together form a conical third flow channel 19 to conduct the dispersion.

As seen in FIGS. 1-4, 10 and 15 the module group 1 comprises also a box module 5. The box module 5 comprises a self-supporting framework structure 7 having a shape of a rectangular parallelepiped with exterior dimensions and corner fittings 6 conforming to ISO shipping container standards, the corner fittings 6 being attached to each corner of the framework structure 7. A first discharge box 20 is supported inside the framework structure 7 for receiving and discharging the lighter solution phase from the first flow channel 17. The box module 5 also comprises a second discharge box 21 supported inside the framework structure 7 for receiving and discharging the heavier solution phase from the second flow channel 18. Further, the box module 5 comprises a feed box 22 supported inside the framework structure 7 for feeding dispersion to the third flow channel 19. The framework structure 7 of the box module 5 may be principally similar (although shorter) to that shown and disclosed in connection with FIG. 6.

Figure 16:
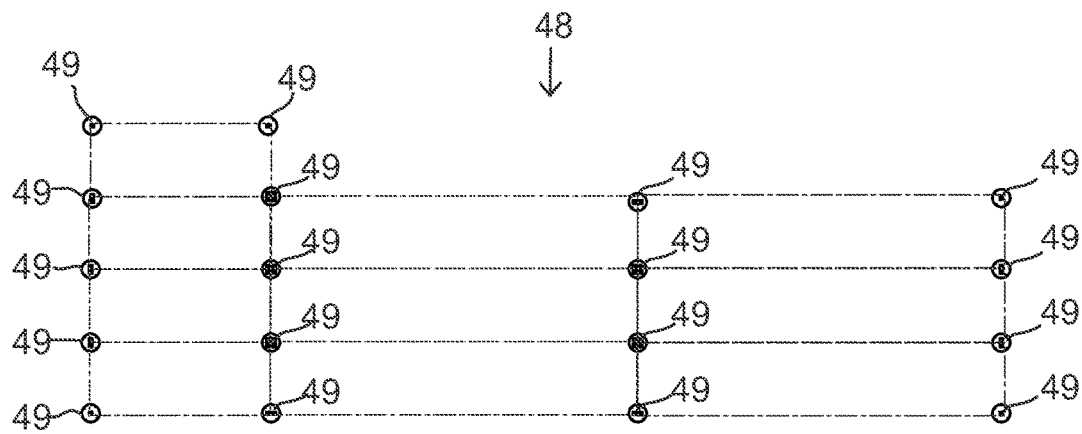
FIG. 16 is a view of the layout of the foundation of the settler of FIG. 1, FIGS. 17 to 20 show an axonometric view of four different types of pillars used in the foundation of FIG. 16, the pillars being equipped with stacking cones as container lashing fittings.

FIG. 16 shows a layout of the foundation designed for the module group 1 of the settler shown in FIG. 1. The settler comprises a foundation 48 on which the module group 1 is supported at a height above the ground level, thereby providing a space for piping and access underneath the settler. The foundation 48 comprises a plurality of pillars 49 having ISO shipping standard compatible container lashing fittings 50, 51 to which the corner fittings 6 of the modules 2, 3, 4, 5 can be connected.

Figures 17, 18, 19, 20:
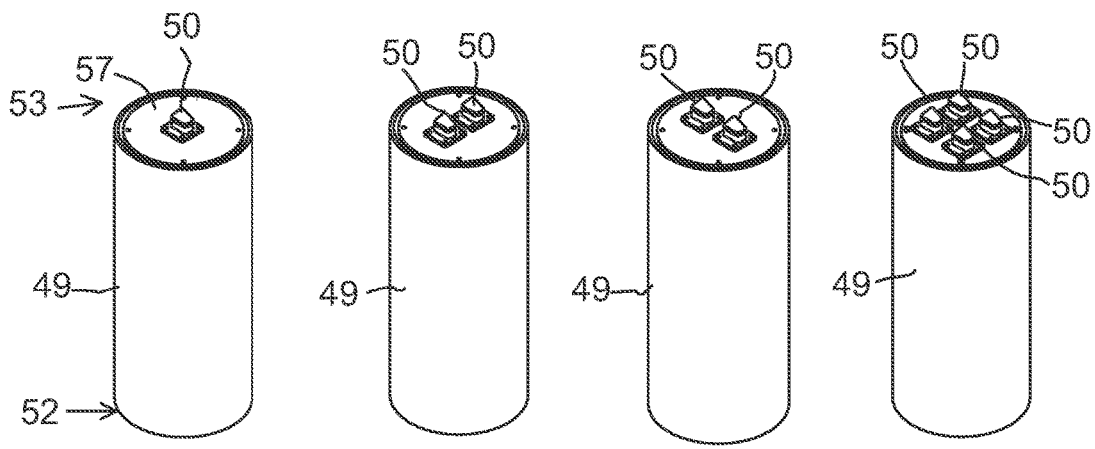
Figures 21, 22, 23:
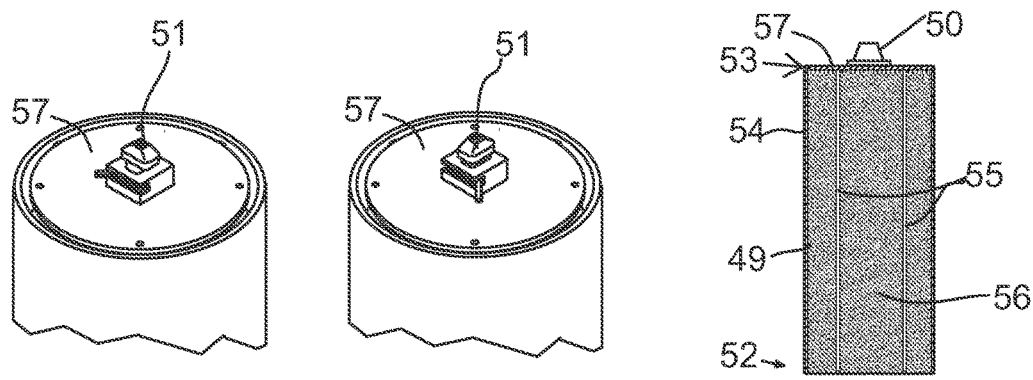
FIGS. 21 and 22 show another embodiment of the pillar equipped with a twist lock as a container lashing fitting.
FIG. 23 shows a schematic longitudinal section of the pillar.

FIGS. 17 and 23 show that the pillar 49 comprises a lower end 52 which is supported on the ground, and an upper end 53. One or more container lashing fittings 50, 51 are attached to the upper end 53. As illustrated in FIGS. 17 to 20, the pillar 49 may comprise one to four container lashing fittings 50, 51 depending on the number of corner fittings 6 to be connected onto the pillar. A pillar 49 supporting one corner of the module comprises only one container lashing fitting 50 (FIG. 17). A pillar 49 supporting two corners of parallel modules comprises a pair of container lashing fittings arranged side-by-side (FIG. 18). A pillar 49 supporting two corners of sequential modules comprises a pair of container lashing fittings 50 arranged in a row (FIG. 19). A pillar 49 supporting four corners of parallel and sequential modules comprises two pairs of container lashing fittings 50 (FIG. 20). The container lashing fittings may be stacking cones 50 as shown in FIGS. 17 to 20, or alternatively they may be twist locks 51 as shown in FIGS. 21 and 22.

With reference to FIG. 23, the pillar 49 comprises a plastic tube 54, a concrete reinforcement of metal arranged inside the plastic tube 54, cast concrete 56 cast inside the plastic tube, and a metal base plate 57 attached at the upper end of the pillar, to which base plate one or more container lashing fittings 50, 51 are fixedly connected.

The solvent extraction settler is manufactured so that at the site of manufacture, such as in an engineering workshop, a plurality of self-supporting settler element modules 2, 3, 4, 5 are manufactured. Each settler element module has exterior dimensions, strength and handling and securing means 6 conforming to ISO shipping container standards. The modules 2, 3, 4, 5 are transported to the site of installation as normal freight by transport equipment, such as trucks, trailers and container ships, capable of handling and transporting ISO compatible units. Finally, at the site of installation the modules 2, 3, 4, 5 are assembled into a complete settler.

Although the invention has been the described in conjunction with certain types of settlers, it should be understood that the invention is not limited to any certain type of settler. While the present inventions have been described in connection with a number of exemplary embodiments and implementations, the present inventions are not so limited, but rather cover various modifications and equivalent arrangements, which fall within the purview of the prospective claims.

The invention claimed is:

1. A method of assembling a solvent extraction settler capable of use in a hydrometallurgical liquid-liquid extraction processes for separating solutions mixed in a dispersion into different solution phases, characterized in that the method comprises the steps of:
   manufacturing at a site of manufacture, a plurality of self-supporting settler element modules,
   transporting the modules to a site of installation, and
   assembling the modules into the solvent extraction settler at the site of installation, where the plurality of self-supporting settler element modules comprises at least two modules sequentially connected to each other in-line to jointly form a plug flow path across the width of the settler, and common to the at least two modules, for dispersion and solutions flowing in the settler, where each of the modules comprises (i) a self-supporting framework structure having a shape of a rectangular parallelepiped with corner fittings attached to each corner of the framework structure and (ii) a shell, which is supported inside the framework structure and forms at least a part of a flow path for the solutions flowing in the settler, where
   the plurality of self-supporting settler element modules comprises two or more groups of at least two modules connected to each other in-line, the two or more groups arranged in parallel with each other, a first one of the at least two modules comprising a coalescing module having one or more coalescing fence elements to coalesce dispersion into different solution phases and a second one of the at least two modules comprising at least one retention module to increase residence time in the settler for enhancing phase separation, said retention module being arranged between the coalescing module and a launder module arranged to receive and discharge separated solutions.

2. A solvent extraction settler assembled from a plurality of self-supporting settler element modules and capable of use in a hydrometallurgical liquid-liquid extraction processes for separating solutions mixed in a dispersion into different solution phases, where the plurality of self-supporting settler element modules comprises at least two modules sequentially connected to each other in-line to jointly form a plug flow path common to the at least two modules for at least one of dispersion and solutions flowing in the settler, where each of the modules comprises (i) a self-supporting framework structure having a shape of a rectangular parallelepiped with corner fittings attached to each corner of the framework structure and (ii) a shell, which is supported inside the framework structure and forms at least a part of a flow path for the solutions flowing in the settler, where the settler comprises a foundation on which the plurality of self-supporting settler element modules is supported at a height above the around level, thereby providing a space for piping access underneath the settler the foundation comprising a plurality of pillars having container lashing fittings to which the corner fittings of the modules are connected.

3. The settler according to claim 2, characterized in that each of the modules conforms to standard ISO 668 Series 1 "Freight containers—Classification, dimensions and ratings" in effect at the time of manufacture, and that the corner fittings conform to standard ISO 1161 Series 1 "Freight containers—Corner fittings—specification" in effect at the time of manufacture.

4. The settler according to claim 2, characterized in that the shell is a hollow body made of a fiber-reinforced plastic composite and manufactured by filament winding technology.

5. The settler according to claim 2, characterized in that the plurality of self-supporting settler element modules comprises two or more groups of at least two modules connected to each other in-line, the two or more groups arranged in parallel with each other.

6. The settler according to claim 5, characterized in that a first one of the at least two modules comprises a coalescing module having one or more coalescing fence elements to coalesce dispersion into different solution phases.

7. The settler according to claim 6, characterized in that a second one of the at least two modules comprises a launder module arranged to feed dispersion to the coalescing module.

8. The settler according to claim 7, characterized in that at least one of the at least two modules comprises at least one retention module to increase residence time in the settler for enhancing phase separation, said retention module being arranged between the coalescing module and the launder module.

9. The settler according to claim 8, characterized in that the cross-section of a shell of the coalescing module is equal to the cross section of a shell of the retention module to enable abutting joint of the shells.

10. The settler according to claim 8, characterized in that the shell of the coalescing module and/or the retention module has a substantially rectangular cross-sectional shape with cambered corners and convexly outwards curved side walls.

11. The settler according to claim 5, characterized in that at least one of the at least two modules comprises a launder module which is arranged to receive and discharge separated solutions.

12. The settler according to claim 11, characterized in that the launder module comprises
a first shell to receive and conduct an overflow of a lighter solution phase, and
a second shell to receive and conduct an underflow of a heavier solution phase.

13. The settler according to claim 12, characterized in that the launder module is a combined feed and discharge launder comprising a third shell to feed dispersion to modules of a next settler.

14. The settler according to claim 12, characterized in that the settler comprises two or more launder modules arranged side-by-side; that first shells of the side-by-side launder modules are abutting and sequentially connected to each other to form a first flow channel which is in the crosswise direction to the direction of a flow path; and that second shells of the side-by-side launder modules are abutting and sequentially connected to each other to form a continuous second flow channel which is in the crosswise direction to the direction of the flow path.

15. The settler according to claim 14, characterized in that the first shells are conical so that the sequentially connected first shells together form a conical first flow channel.

16. The settler according to claim 14, characterized in that the second shells are conical so that the sequentially connected second shells of the launder modules together form the conical second flow channel.

17. The settler according to claim 16, characterized in that the plurality of self-supporting settler element modules comprises a box module comprising
a first discharge box supported inside the framework structure for receiving and discharging the lighter solution phase from the first flow channel, and
a second discharge box supported inside the framework structure for receiving and discharging the heavier solution phase from the second flow channel.

18. The settler according to claim 17, characterized in that the box module comprises a feed box supported inside the framework structure for feeding dispersion to the third flow channel.

19. The settler according to claim 14, having sequentially connected third shells capable of feeding dispersion to modules of a next settler, where the third shells are conical so that the sequentially connected third shells together form a conical third flow channel.

20. The settler according to claim 2, characterized in that the framework structure comprises
a first end frame comprising:
    a horizontal first lower beam,
    a horizontal first upper beam at a distance from the first lower beam,
    a vertical first corner post which is fixedly connected to a first end of the first lower beam, defining a first corner, the vertical first corner post being fixedly connected to a first end of the first upper beam, defining a second corner,
    a vertical second corner post at a distance from the first corner post, the vertical second corner post being fixedly connected to a second end of the first lower beam, defining a third corner, the vertical second corner post being fixedly connected to a second end of the first upper beam, defining a fourth corner,
a second end frame comprising
    a horizontal second lower beam,
    a horizontal second upper beam at a distance from the second lower beam,
    a vertical third corner post which is fixedly connected to a first end of the second lower beam, defining a fifth corner, the vertical third corner post being fixedly connected to a first end of the second upper beam defining a sixth corner,
    a vertical fourth corner post at a distance from the third corner post, the vertical fourth corner post being fixedly connected to a second end of the second lower beam, defining a seventh corner, the vertical fourth corner post being fixedly connected to a second end of the second upper beam, defining an eighth corner,
a first bottom side rail fixedly connected to the first end frame at the first corner and to the second end frame at the fifth corner,
a second bottom side rail fixedly connected to the first end frame at the third corner and to the second end frame at the seventh corner,
a first top side rail fixedly connected to the first end frame at the second corner and to the second end frame at the sixth corner,
a second top side rail fixedly connected to the first end frame at the fourth corner and to the second end frame at the eighth corner, bottom cross members fixedly connected between and to the first and second bottom side rails,
top cross members fixedly connected between and to the first and second top side rails,
side cross members fixedly connected between and to the bottom side rails and the top side rails,
and that a corner fitting is attached to each of the first corner, second corner, third corner, fourth corner, fifth corner, sixth corner, seventh corner and eighth corner.

21. The settler according to claim 2, characterized in that each pillar comprises a lower end which is supported on the ground, an upper end, and one or more container lashing fittings attached to the upper end of the pillar.

22. The settler according to claim 21, characterized in that the container lashing fitting comprises a stacking cone.

23. The settler according to claim 21, characterized in that the container lashing fitting comprises a twist lock.

24. The settler according to claim 21, characterized in that each pillar comprises one to four container lashing fittings.

25. The settler according to claim 21, characterized in that each pillar comprises a plastic tube, reinforcement for concrete arranged inside the plastic tube, cast concrete cast inside the plastic tube, and a metal base plate attached at the upper end of the pillar, to which base plate one or more container lashing fittings are fixedly connected.

* * * * *

UNITED STATES PATENT AND TRADEMARK OFFICE
CERTIFICATE OF CORRECTION

PATENT NO. : 10,220,331 B2  
APPLICATION NO. : 14/408417  
DATED : March 5, 2019  
INVENTOR(S) : Vaarno et al.

Page 1 of 1

It is certified that error appears in the above-identified patent and that said Letters Patent is hereby corrected as shown below:

In the Claims

At Column 12, Line 63:
"above the around level" should read – above the ground level –.

At Column 12, Line 65:
"plurality of pillers" should read – plurality of pillars –.

Signed and Sealed this
Thirty-first Day of December, 2019

Andrei Iancu
*Director of the United States Patent and Trademark Office*